Patented June 9, 1931

1,809,224

UNITED STATES PATENT OFFICE

KARL THIESS AND THEODOR MEISSNER, OF FRANKFORT-ON-THE-MAIN-HOCHST, AND WERNER ZERWECK, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

VAT DYESTUFFS

No Drawing. Application filed July 23, 1929, Serial No. 380,455, and in Germany August 27, 1928.

The present invention relates to vat dyestuffs.

We have found that excellent vat dyestuffs are obtainable by condensing 4-alkyl-5-halogen-7-alkoxy-isatin-alpha-derivatives with compounds of the following general formula:

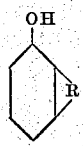

wherein R stands for a naphthylene or phenylene residue.

The reaction preferably is carried out in the presence of a solvent, such, for instance, as benzene, chlorobenzene, nitrobenzene or the like, while gently heating. When using alpha-arylides, water may also be used as a solvent. The dyestuffs thus obtainable probably correspond to the following general formula:

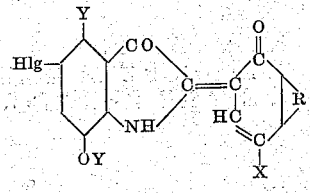

wherein R stands for a naphthylene or phenylene residue, X for hydrogen or halogen, Y for alkyl and Hlg for halogen.

They are valuable vat dyestuffs yielding on the cotton fiber very beautiful greenish-blue tints of good fastness properties. The new dyestuffs are also very useful for printing cotton.

The following examples serve to illustrate our invention but they are not intended to limit it thereto; the parts being by weight:—

(1) 18 parts of 4-chloro-1-naphthol are dissolved in 100 parts of hot chlorobenzene and slowly mixed at a temperature of 40° C. with a solution of 4-methyl-5-chloro-7-methoxy-isatin-alpha-chloride in chlorobenzene (prepared by heating 22.6 parts of 4-methyl-5-chloro-7-methoxy-isatin with 22 parts of phosphorous pentachloride in 200 parts of chlorobenzene). The solution is then heated to 45° C. until the evolution of hydrochloric acid has decreased. The solution assumes a blue coloration and on cooling the dyestuff precipitates almost entirely. After the dyestuff has been filtered, washed with alcohol and water and dried it represents a blue crystalline powder and probably has the following formula:

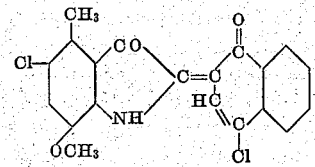

It dyes cotton from the vat beautiful fast greenish-blue tints and is particularly suitable for printing cotton.

(2) 22 parts of 4-bromo-1-naphthol are dissolved in 150 parts of hot chlorobenzene and mixed at a temperature of 40° C. with a solution of 4-methyl-5-bromo-7-methoxy-isatin-alpha-chloride (prepared by heating 27 parts of 4-methyl-5-bromo-7-methoxy-isatin and 22 parts of phosphorous pentachloride in 250 parts of chlorobenzene). After shortly heating the solution to about 45° C. to 50° C. until the evolution of hydrochloric acid decreases and then cooling the dyestuff which has separated is filtered by suction and washed with alcohol and water. The dyestuff thus obtained represents in a dry state a blue powder dyeing cotton from a yellow vat beautiful greenish-blue tints of a more greenish shade than those obtained by the dyestuff of Example 1. It is particularly suitable for printing cotton.

By using in Examples 1 and 2 instead of the 4-methyl-5-halogen-7-alkoxy-isatin-alpha-halides the alpha-arylides, the condensation also may be carried out in water instead of in an organic solvent.

(3) 20 parts of alpha-anthrol (alpha-hydroxyanthracene) are dissolved in 200 parts of chlorobenzene while heating. 22.6 parts of 4-methyl-5-chloro-7-methoxy-isatin are converted into the corresponding isatin-alpha-chloride by heating with a solution of 22 parts of phosphorous pentachloride in 200 parts of chlorobenzene. After the two solutions have been mixed advantageously at a temperature of from 40° C. to 50° C. the dyestuff separates at once in a crystalline form. In order to complete the formation of the dyestuff, the solution is shortly heated to 80° C. to 90° C. and allowed to cool. The dyestuff is then filtered by suction and washed free from chlorobenzene by means of alcohol. The 2-anthracene-4'-methyl-5'-chloro-7'-methoxy-2'-indol-indigo thus obtained has the formula:

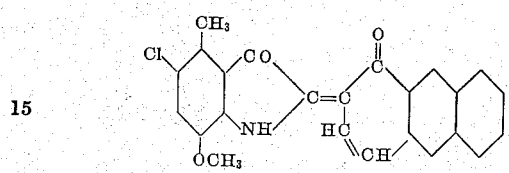

and represents when being dried a greenish-blue powder which dissolves in concentrated sulfuric acid to a moss-green solution and in nitrobenzene to a bluish-green solution. It dyes the fiber from a clear, yellowish-brown vat beautiful greenish-blue tints and is highly suitable for printing purposes.

(4) By replacing in Example 3 the 4-methyl-5-chloro-7-methoxy-isatin by 27 parts of 4-methyl-5-bromo-7-methoxy-isatin and then proceeding in the same way as in the said foregoing example the 2-anthracene-4'-methyl-5'-bromo-7'-methoxy-2'-indol-indigo is obtained the properties of which are very similar to those of the dyestuff prepared according to Example 3. It dyes the fiber from a yellowish-brown vat greenish-blue tints of a somewhat more greenish shade than those obtained by the dyestuff prepared according to Example 3.

We claim:

1. As new products, compounds of the following probable formula:

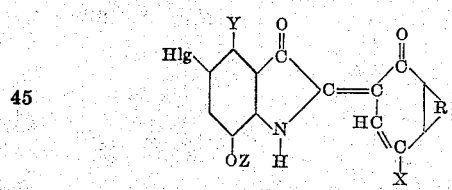

wherein R stands for a naphthylene or phenylene residue, X for hydrogen or halogen, Y and Z for alkyl and Hlg for halogen, being vat dyestuffs of very good fastness properties.

2. As new products, compounds of the following probable formula:

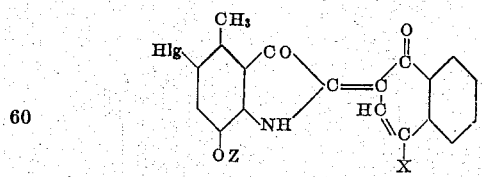

wherein X stands for halogen, Z for alkyl and Hlg for halogen, being vat dyestuffs of very good fastness properties.

3. As new products, compounds of the following probable formula:

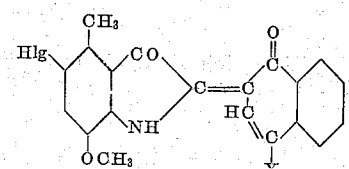

wherein X and Hlg stand for chlorine or bromine, being vat dyestuffs of very good fastness properties.

4. As a new product, a compound of the following probable formula:

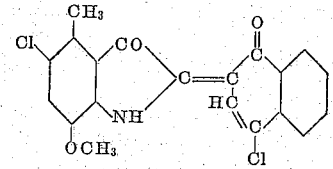

being a blue crystalline powder which dyes cotton from the vat beautiful fast greenish-blue tints and is particularly useful for printing cotton.

5. As a new product, the compound of the following probable formula:

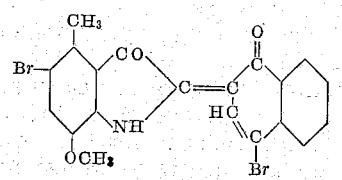

being a blue powder which dyes cotton from a yellow vat beautiful greenish-blue tints and is particularly suitable for printing cotton.

In testimony whereof, we affix our signatures.

KARL THIESS.
THEODORE MEISSNER.
WERNER ZERWECK.